US011228171B2

(12) United States Patent
Dent

(10) Patent No.: US 11,228,171 B2
(45) Date of Patent: Jan. 18, 2022

(54) OVERCURRENT TRIP COORDINATION BETWEEN INVERTER AND CIRCUIT BREAKERS

(71) Applicant: Koolbridge Solar, Inc., Wrightsville Beach, NC (US)

(72) Inventor: Paul Wilkinson Dent, Pittsboro, NC (US)

(73) Assignee: Koolbridge Solar, Inc., Wrightsville Beach, NC (US)

( * ) Notice: Subject to any disclaimer, the term of this patent is extended or adjusted under 35 U.S.C. 154(b) by 803 days.

(21) Appl. No.: 15/676,775

(22) Filed: Aug. 14, 2017

(65) Prior Publication Data

US 2019/0052075 A1  Feb. 14, 2019

(51) Int. Cl.
*H02H 7/122* (2006.01)
*H02M 7/5387* (2007.01)
(Continued)

(52) U.S. Cl.
CPC .......... *H02H 7/1227* (2013.01); *H02H 7/122* (2013.01); *H02H 7/26* (2013.01); *H02J 3/04* (2013.01); *H02J 3/383* (2013.01); *H02J 3/35* (2013.01); *H02M 1/32* (2013.01); *H02M 1/36* (2013.01); *H02M 7/53871* (2013.01); *H02H 3/025* (2013.01); *H02H 3/063* (2013.01);
(Continued)

(58) Field of Classification Search
CPC ...... H02J 7/00; H02J 3/00; H02J 9/00; H02H 7/00; H02M 1/00; Y02E 10/00; Y02E 40/00
USPC .......................................................... 307/26
See application file for complete search history.

(56) References Cited

U.S. PATENT DOCUMENTS 3,340,457 A   9/1967  Schmitz
3,805,141 A   4/1974  Pompa, Jr. et al.
(Continued)

FOREIGN PATENT DOCUMENTS

CN   101350569 A   1/2009
CN   202444440 U   9/2012
(Continued)

OTHER PUBLICATIONS

Intersil, George E. Danz, HIP4080, 80V High Frequency H-Bridge Driver, Application Note. AN9324.4, Mar. 2003.

*Primary Examiner* — Rexford N Barnie
*Assistant Examiner* — Joseph N Inge
(74) *Attorney, Agent, or Firm* — Coats & Bennett, PLLC

(57) ABSTRACT

An electrical installation having a first source of power, such as the utility grid, and a second source of power from an electronic DC-to-AC converter, comprises a smart load center for selecting the source of power independently for each of a number of branch circuits protected by circuit breakers to be the first source or the second source. The smart load center comprises a software-controlled processor for operating the transfer relays that select the first or second source of power for each branch circuit. In the event that a current overload on a branch circuit connected to the DC-to-AC converter causes it to trip before the branch circuit breaker clears the overload, all circuits are transferred to the first power source to trip the fault breaker and then the microprocessor enters a restart sequence to verify that the fault is cleared or else to take other action.

10 Claims, 11 Drawing Sheets

(51) Int. Cl.
  *H02J 3/04* (2006.01)
  *H02J 3/38* (2006.01)
  *H02M 1/36* (2007.01)
  *H02M 1/32* (2007.01)
  *H02J 7/35* (2006.01)
  *H02H 7/26* (2006.01)
  *H02J 9/06* (2006.01)
  *H02J 3/32* (2006.01)
  *H02H 3/02* (2006.01)
  *H02H 3/06* (2006.01)

(52) U.S. Cl.
  CPC ............... *H02J 3/32* (2013.01); *H02J 9/061* (2013.01); *H02J 9/062* (2013.01)

(56) References Cited

U.S. PATENT DOCUMENTS

| | | | |
|---|---|---|---|
| 3,958,174 A | 5/1976 | Studtmann et al. | |
| 4,084,220 A | 4/1978 | Akamatsu | |
| 4,180,853 A | 12/1979 | Scorso, Jr. et al. | |
| 4,204,268 A | 5/1980 | Vivirito | |
| 4,320,449 A | 3/1982 | Carroll | |
| 4,803,611 A | 2/1989 | Sashida et al. | |
| 4,882,120 A | 11/1989 | Roe et al. | |
| 5,226,077 A | 7/1993 | Lynn et al. | |
| 5,270,636 A | 12/1993 | Lafferty | |
| 5,373,433 A | 12/1994 | Thomas | |
| 5,424,894 A | 6/1995 | Briscall et al. | |
| 5,479,086 A | 12/1995 | Konstanzer | |
| 5,625,276 A | 4/1997 | Scott et al. | |
| 5,680,302 A | 10/1997 | Iwata et al. | |
| 5,714,869 A | 2/1998 | Tamechika et al. | |
| 5,726,505 A | 3/1998 | Yamada et al. | |
| 5,930,128 A | 7/1999 | Dent | |
| 5,991,645 A | 11/1999 | Yuen et al. | |
| 6,051,954 A | 4/2000 | Nagao et al. | |
| 6,154,379 A | 11/2000 | Okita | |
| 7,057,485 B2 | 6/2006 | Preusse et al. | |
| 7,082,040 B2 | 7/2006 | Raddi et al. | |
| 7,138,730 B2 | 11/2006 | Lai | |
| 7,474,016 B2 | 1/2009 | Wang et al. | |
| 8,891,211 B2 | 11/2014 | Dent | |
| 8,937,822 B2 | 1/2015 | Dent | |
| 9,190,836 B2 | 11/2015 | Dent | |
| 9,455,645 B1 | 9/2016 | Zhou et al. | |
| 9,634,552 B2 | 4/2017 | Dent | |
| 10,180,695 B1 | 1/2019 | Bikulcius | |
| 2002/0047455 A1 | 4/2002 | Dhyanchand et al. | |
| 2003/0094929 A1 | 5/2003 | Pendell | |
| 2003/0094931 A1 | 5/2003 | Renyolds | |
| 2003/0169548 A1* | 9/2003 | Clarey | H02H 3/044 361/78 |
| 2003/0179063 A1 | 9/2003 | Preusse et al. | |
| 2004/0100149 A1 | 5/2004 | Lai | |
| 2005/0001598 A1 | 1/2005 | Belokon et al. | |
| 2005/0056021 A1 | 3/2005 | Belokon et al. | |
| 2005/0073292 A1 | 4/2005 | Hastings et al. | |
| 2005/0180083 A1 | 8/2005 | Takahara et al. | |
| 2006/0158037 A1 | 7/2006 | Danley et al. | |
| 2007/0095062 A1 | 5/2007 | Chertok | |
| 2007/0292724 A1 | 12/2007 | Gilchrist | |
| 2009/0161392 A1 | 6/2009 | Zhang et al. | |
| 2009/0184706 A1 | 7/2009 | Duric et al. | |
| 2009/0206666 A1 | 8/2009 | Sella et al. | |
| 2010/0064424 A1 | 3/2010 | Hsu et al. | |
| 2010/0071744 A1 | 3/2010 | Peurach et al. | |
| 2011/0019316 A1 | 1/2011 | Zhan et al. | |
| 2011/0037600 A1 | 2/2011 | Takehara et al. | |
| 2011/0043160 A1 | 2/2011 | Serban | |
| 2011/0088741 A1 | 4/2011 | Dunton et al. | |
| 2011/0090607 A1 | 4/2011 | Luebke et al. | |
| 2011/0140520 A1 | 6/2011 | Lee | |
| 2011/0285354 A1 | 11/2011 | Iwasa | |
| 2011/0301772 A1 | 12/2011 | Zuercher et al. | |
| 2012/0007459 A1 | 1/2012 | Mondal et al. | |
| 2012/0048325 A1 | 3/2012 | Matsuo et al. | |
| 2012/0049637 A1 | 3/2012 | Teichmann et al. | |
| 2012/0112557 A1 | 5/2012 | Sager | |
| 2012/0242145 A1 | 9/2012 | Espeut, Jr. | |
| 2012/0281444 A1* | 11/2012 | Dent | H02J 7/35 363/56.01 |
| 2013/0057997 A1 | 3/2013 | Dent | |
| 2013/0058144 A1 | 3/2013 | Hiramatsu et al. | |
| 2013/0070494 A1 | 3/2013 | Rotzoll | |
| 2013/0181655 A1 | 7/2013 | Yokoyama et al. | |
| 2013/0181703 A1 | 7/2013 | Ausserlechner | |
| 2013/0245614 A1 | 9/2013 | Seebruch | |
| 2013/0320929 A1 | 12/2013 | Walker et al. | |
| 2014/0062206 A1 | 3/2014 | Bryson | |
| 2014/0084687 A1 | 3/2014 | Dent | |
| 2014/0153303 A1 | 6/2014 | Potharaju | |
| 2014/0266289 A1 | 9/2014 | Della Sera et al. | |
| 2015/0008748 A1* | 1/2015 | Deboy | H02M 7/53871 307/77 |
| 2015/0043110 A1 | 2/2015 | Dent | |
| 2015/0207401 A1 | 7/2015 | Zhang et al. | |
| 2015/0217656 A1 | 8/2015 | Loftus et al. | |
| 2015/0229131 A1 | 8/2015 | Gerhardinger | |
| 2015/0295413 A1 | 10/2015 | Dent | |
| 2015/0318796 A1 | 11/2015 | Dent | |
| 2015/0349708 A1 | 12/2015 | Moslehi | |
| 2016/0036235 A1 | 2/2016 | Getsla | |
| 2016/0065090 A1 | 3/2016 | Dent | |
| 2016/0224083 A1 | 8/2016 | Dent et al. | |
| 2016/0226560 A1 | 8/2016 | Dent | |
| 2016/0261226 A1 | 9/2016 | Hamilton et al. | |
| 2016/0276837 A1 | 9/2016 | Manjrekar | |
| 2016/0372927 A1 | 12/2016 | Dent | |
| 2017/0346413 A1 | 11/2017 | Dent | |
| 2018/0006601 A1 | 1/2018 | Dent | |
| 2018/0026550 A1 | 1/2018 | Dent | |

FOREIGN PATENT DOCUMENTS

| | | |
|---|---|---|
| EP | 2544354 A2 | 1/2013 |
| EP | 2698894 A2 | 2/2014 |
| GB | 1433402 A | 4/1976 |
| WO | 2012140495 A2 | 10/2012 |
| WO | 2016033394 A1 | 3/2016 |
| WO | 2016204830 A1 | 12/2016 |

* cited by examiner

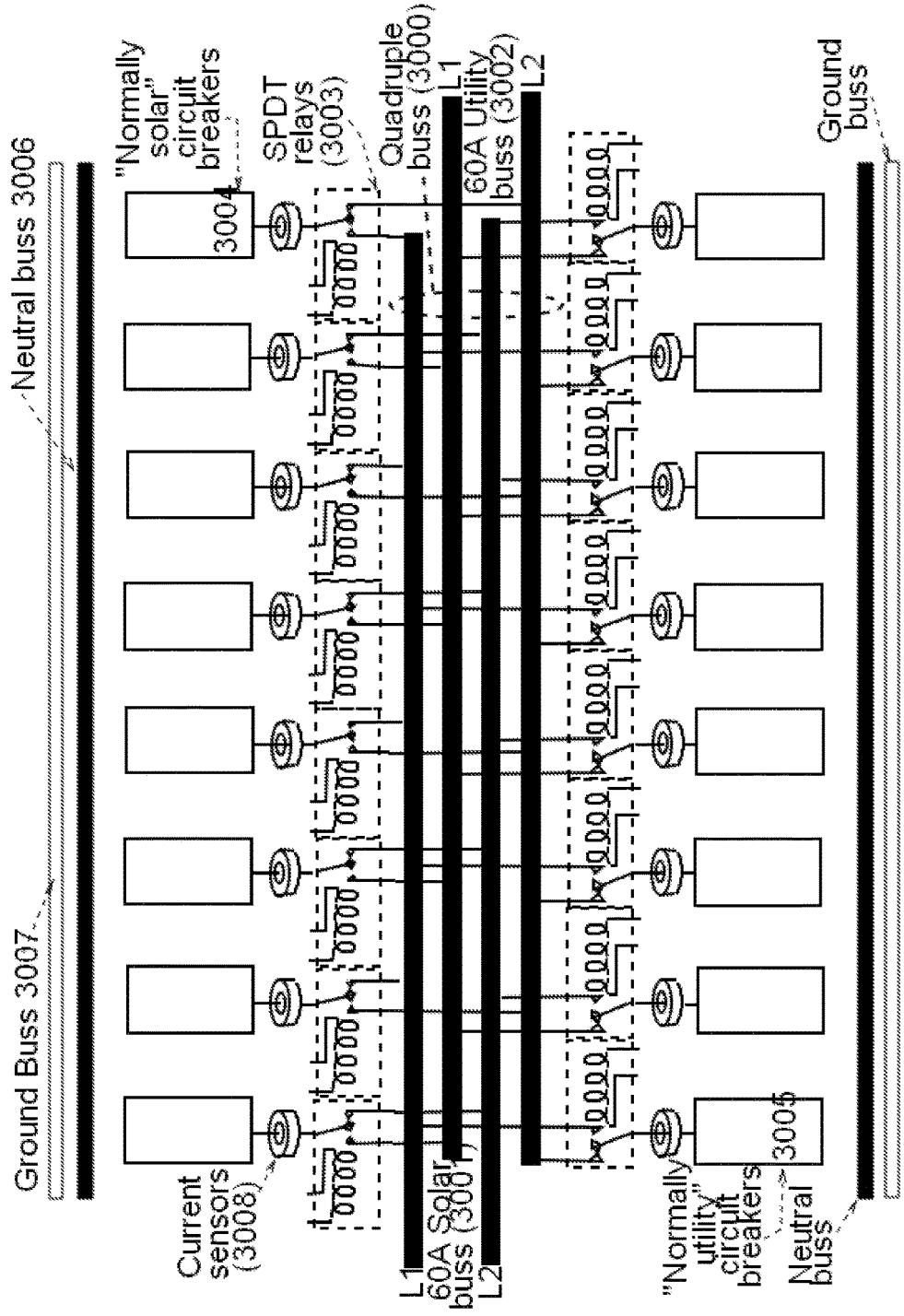

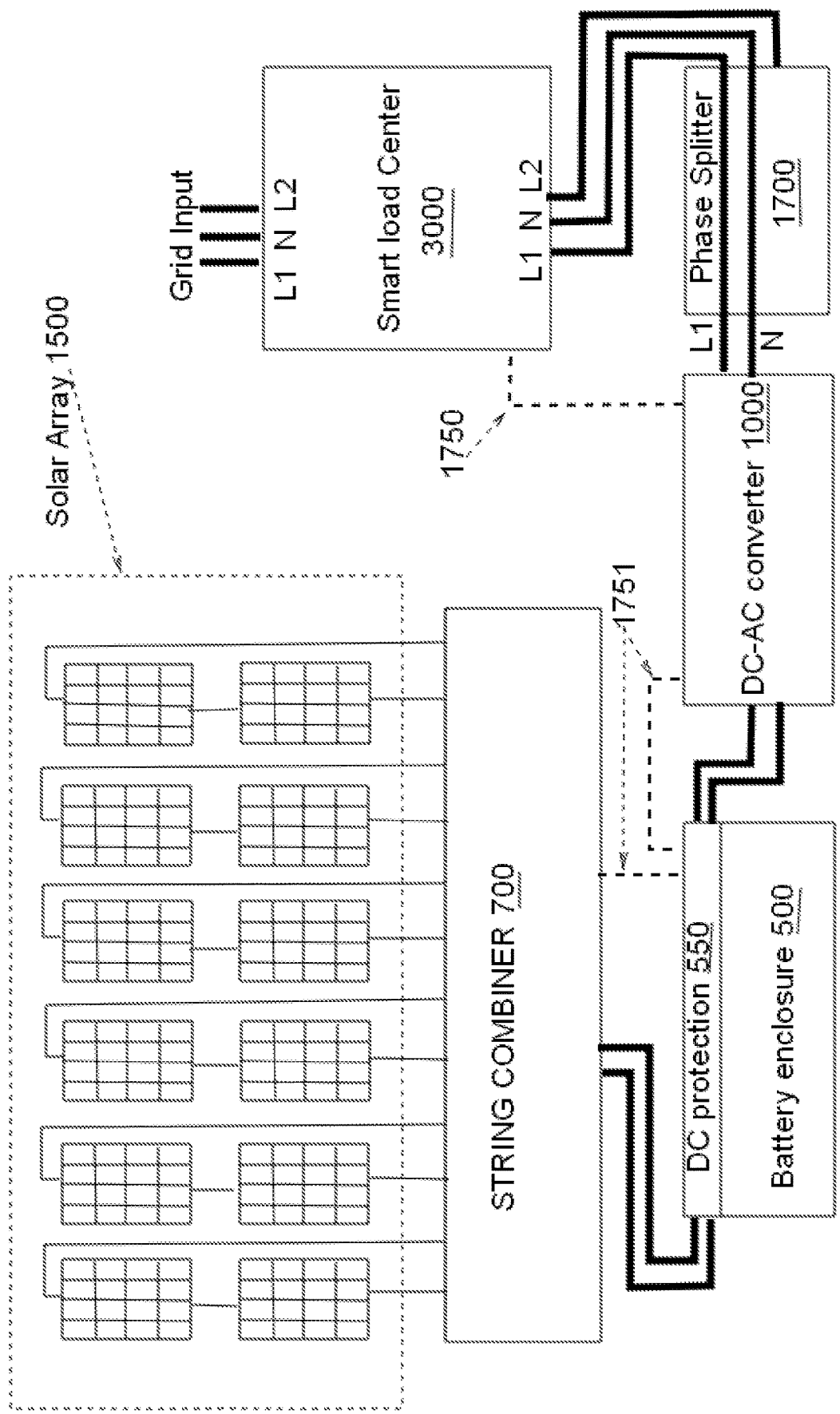
Figure 2: Solar installation using the invention

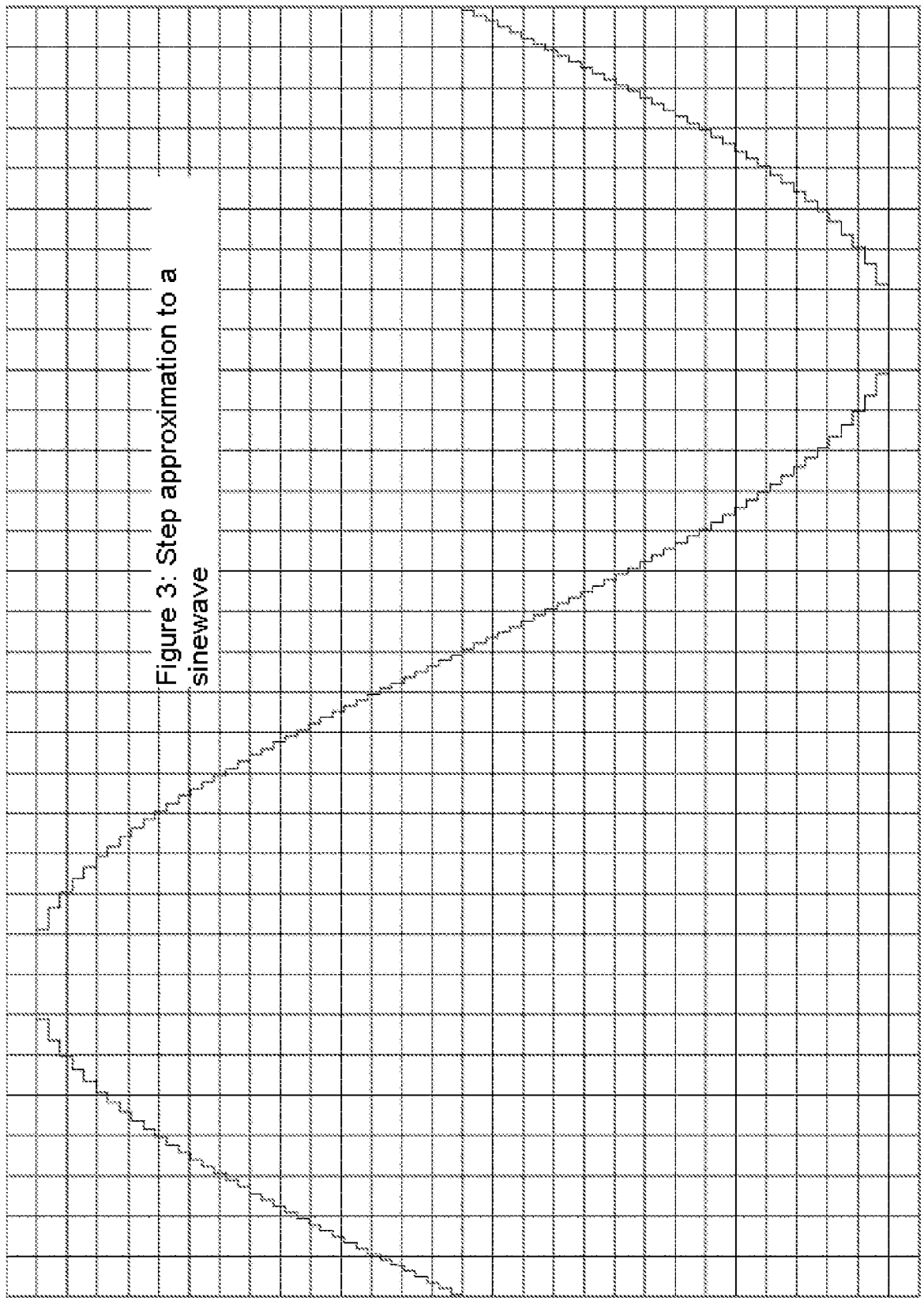

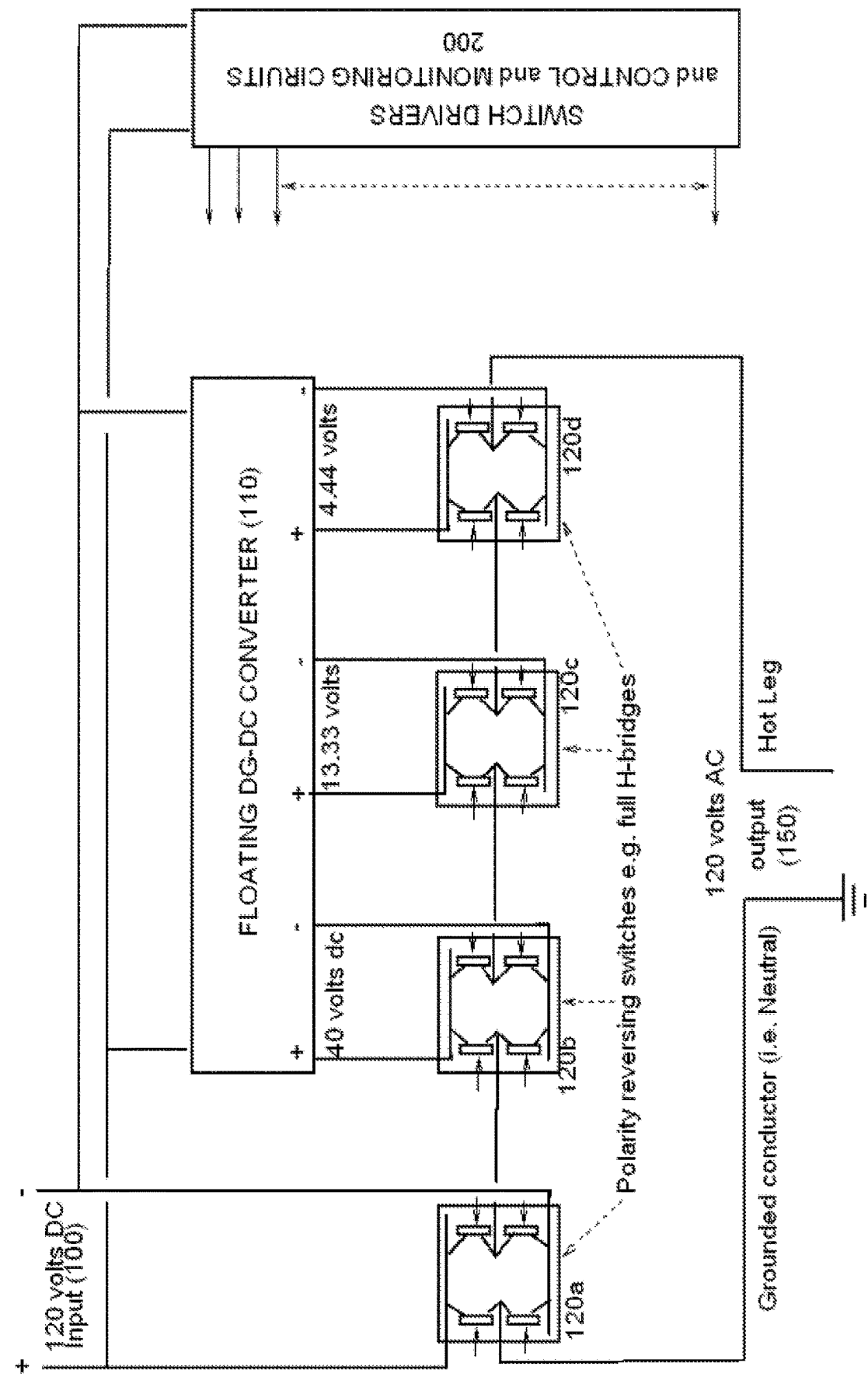
Figure 4: Principle of the step-approximation inverter

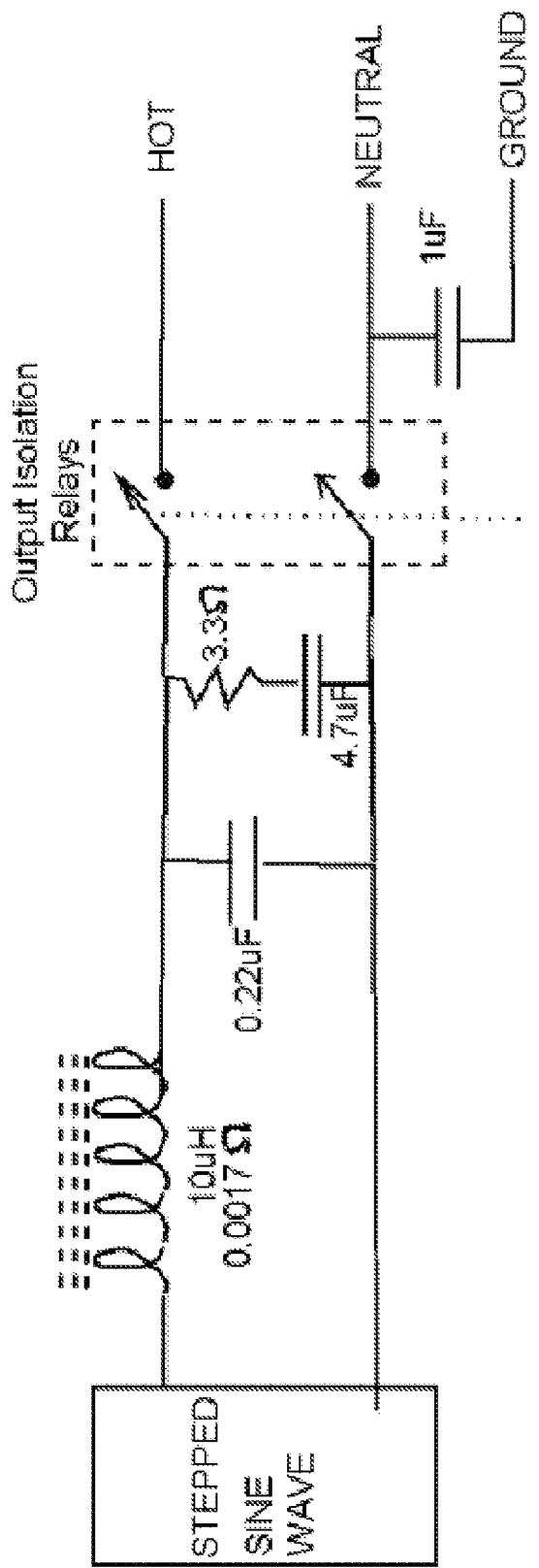
Figure 5: Output low pass filter

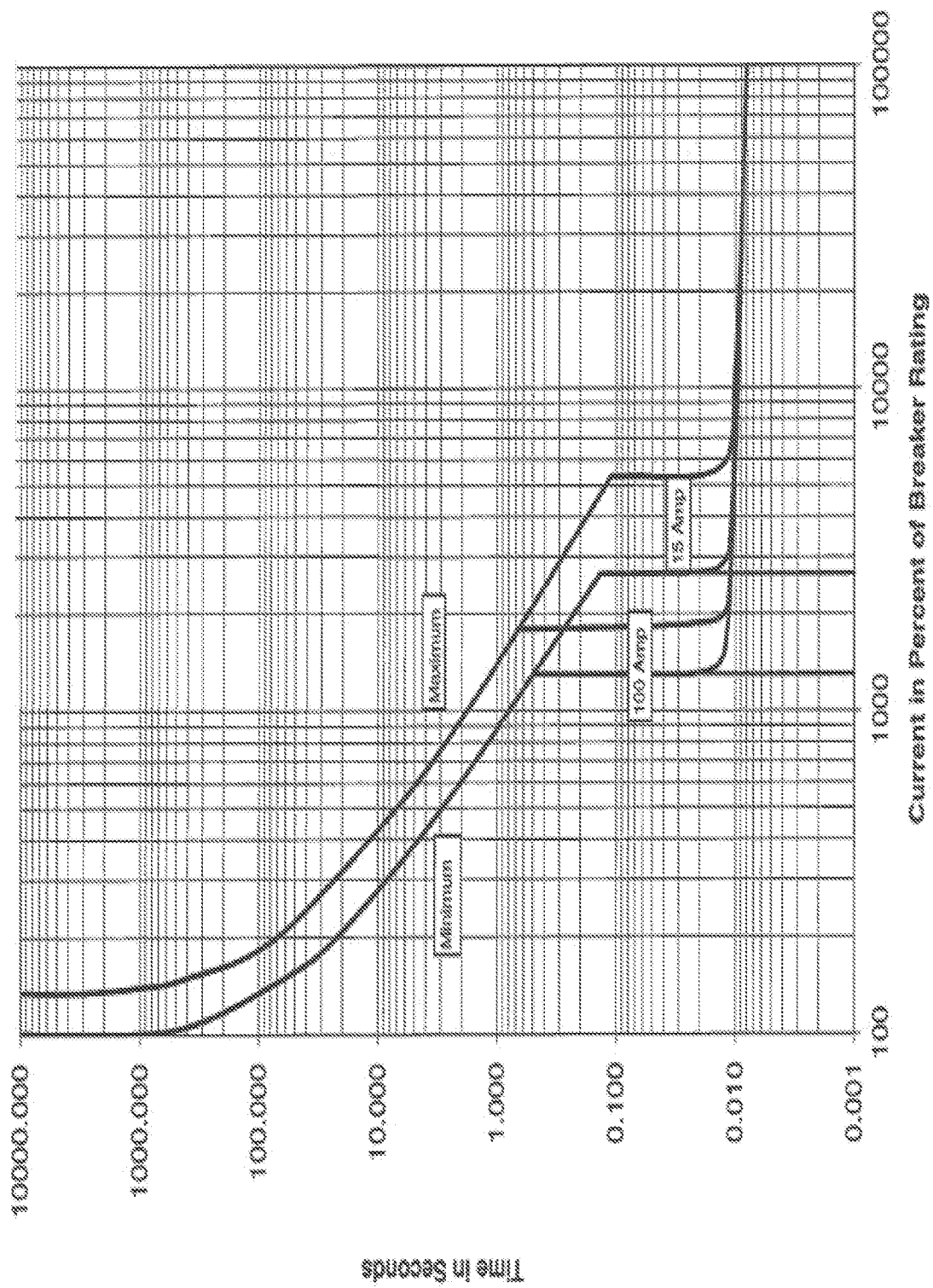
Figure 6: Typical time versus current overload circuit breaker trip curves

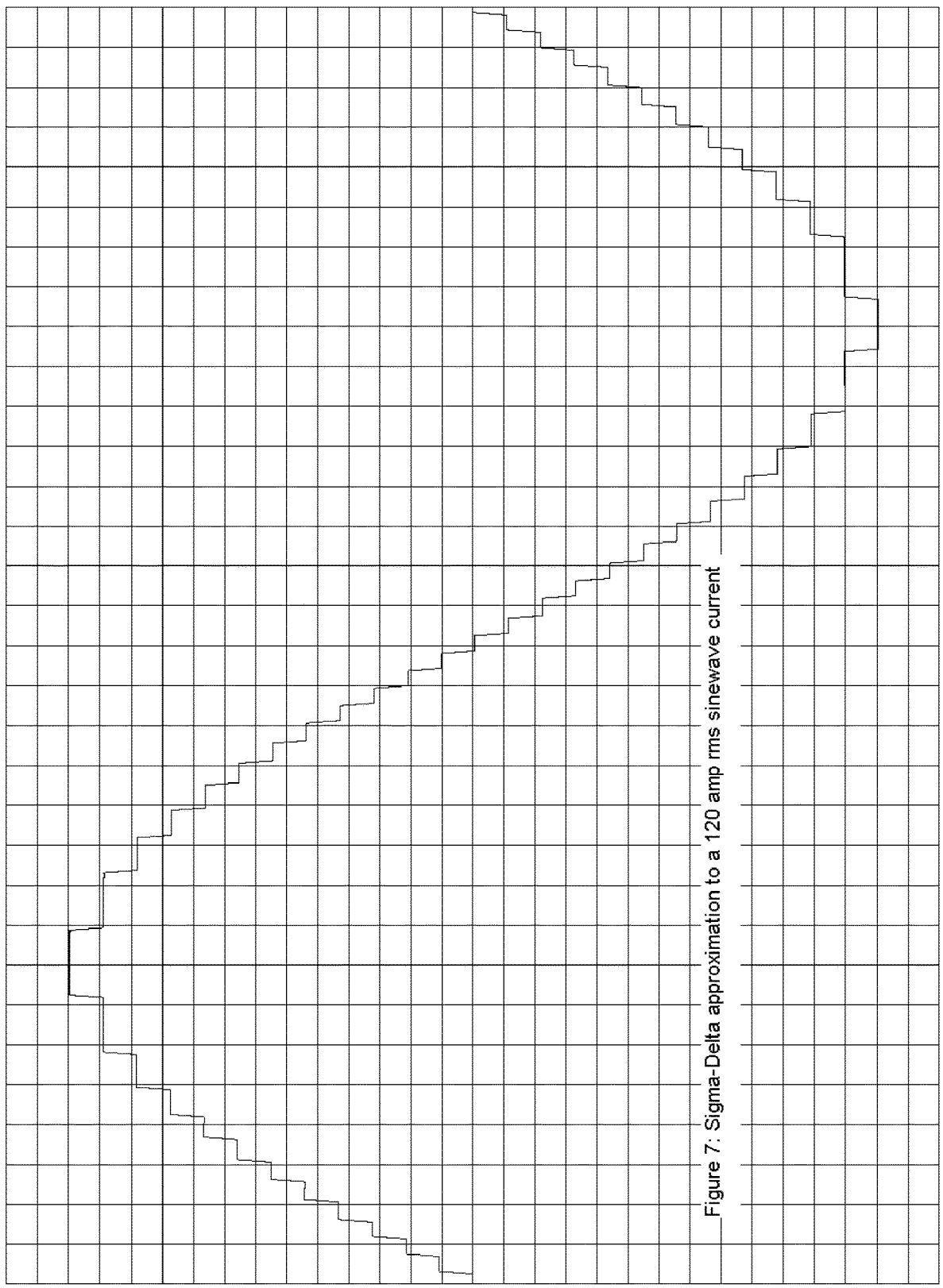
Figure 7: Sigma-Delta approximation to a 120 amp rms sinewave current

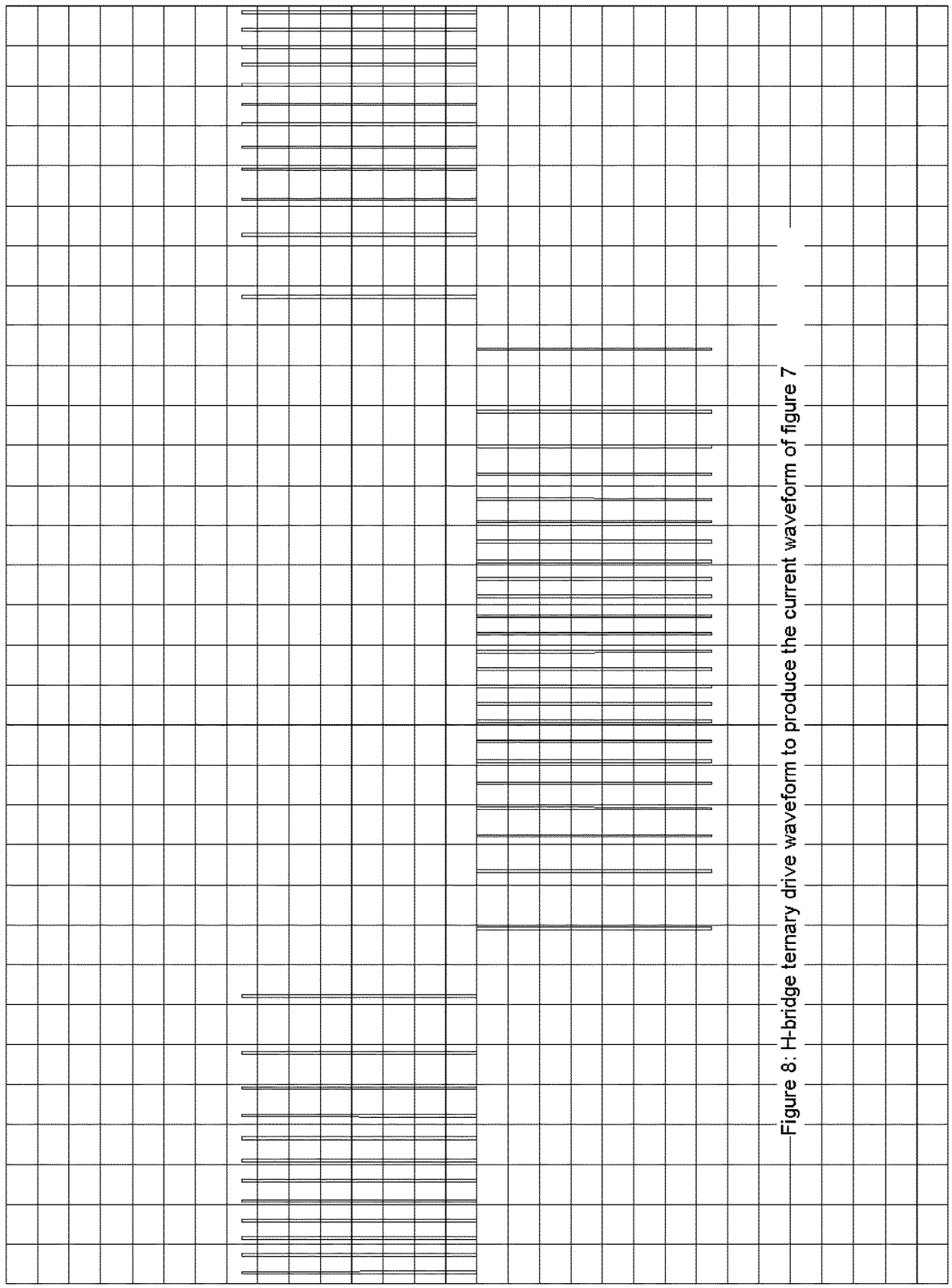
Figure 8: H-bridge ternary drive waveform to produce the current waveform of figure 7

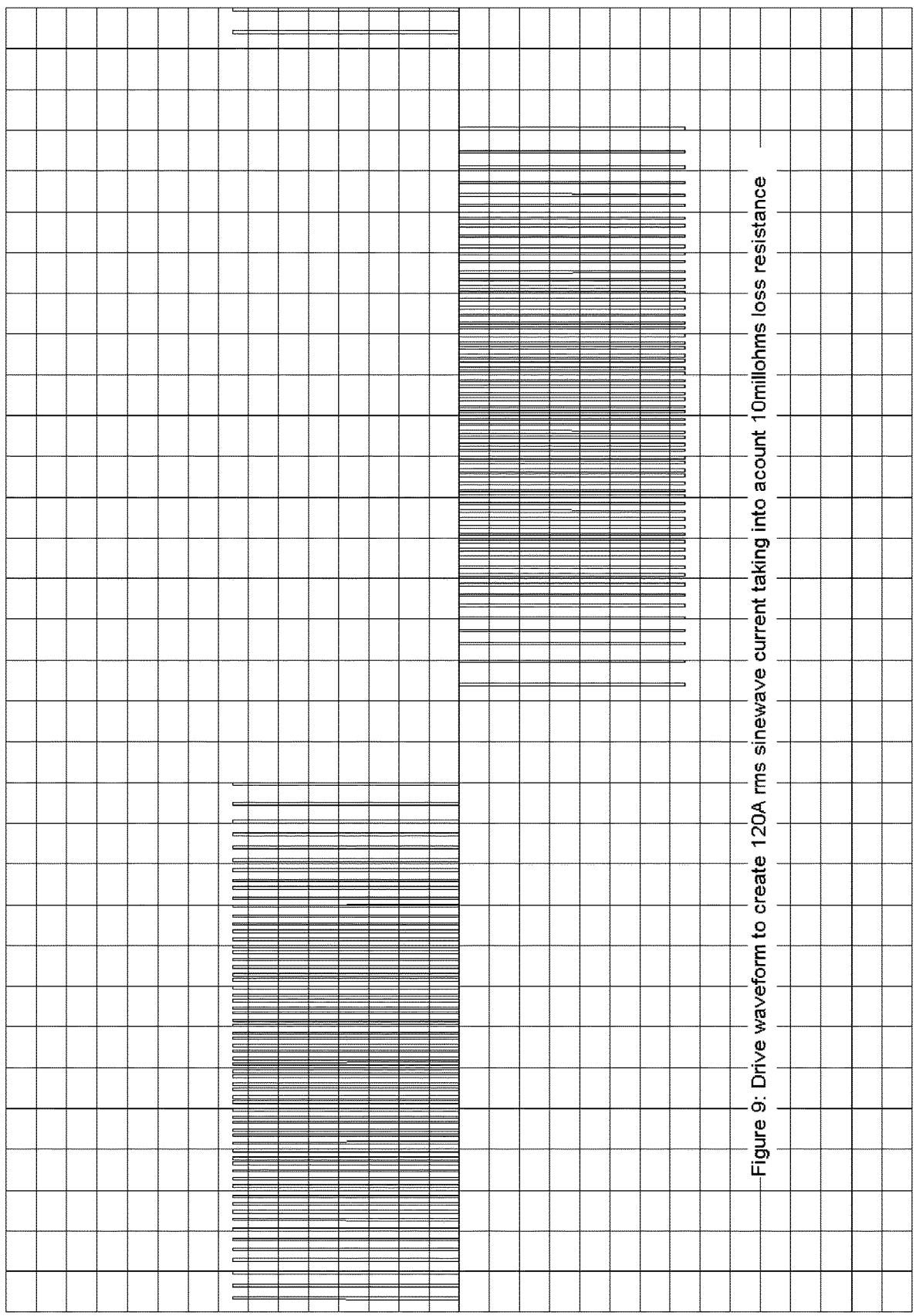
Figure 9: Drive waveform to create 120A rms sinewave current taking into acount 10milliohms loss resistance

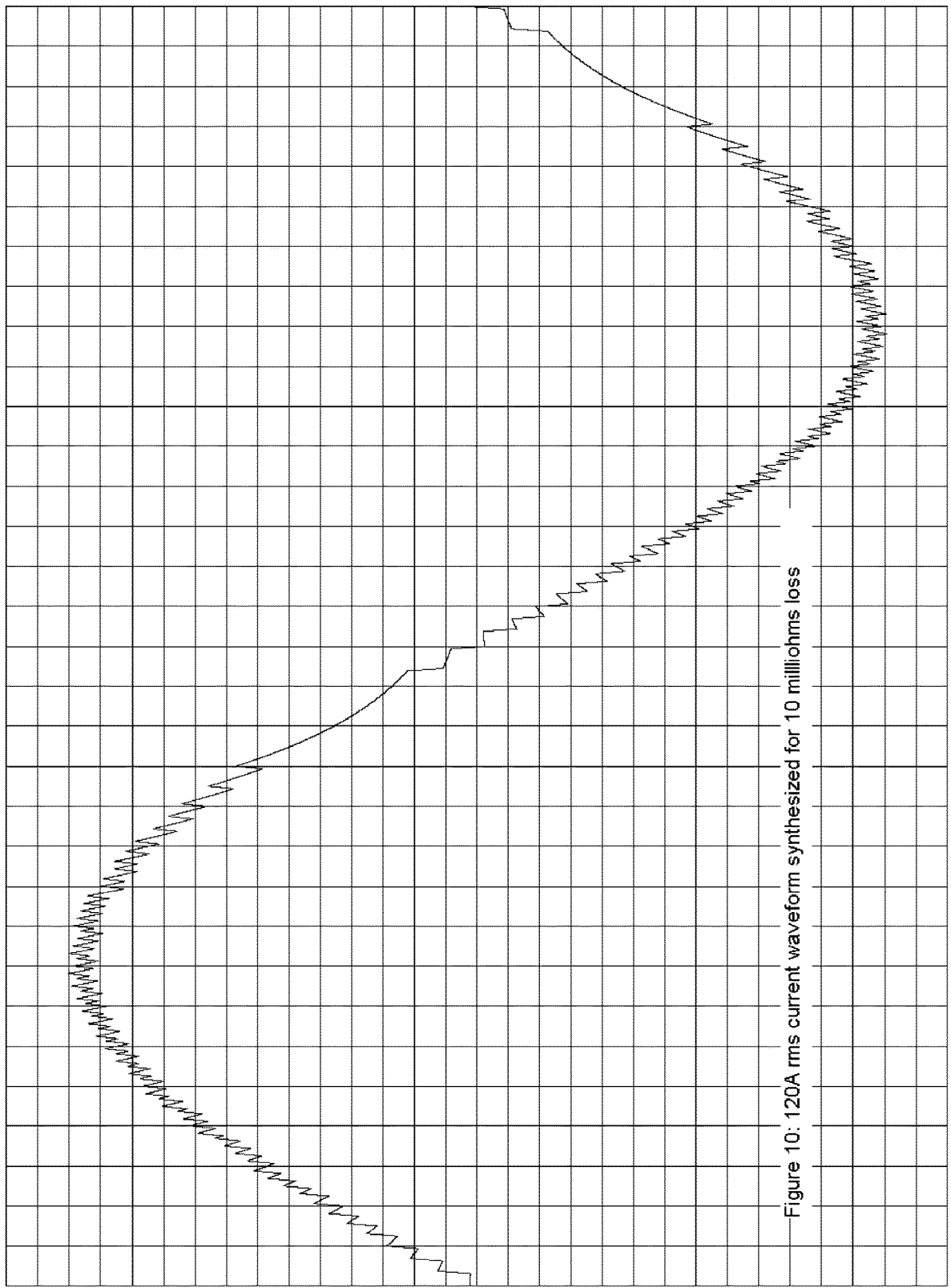

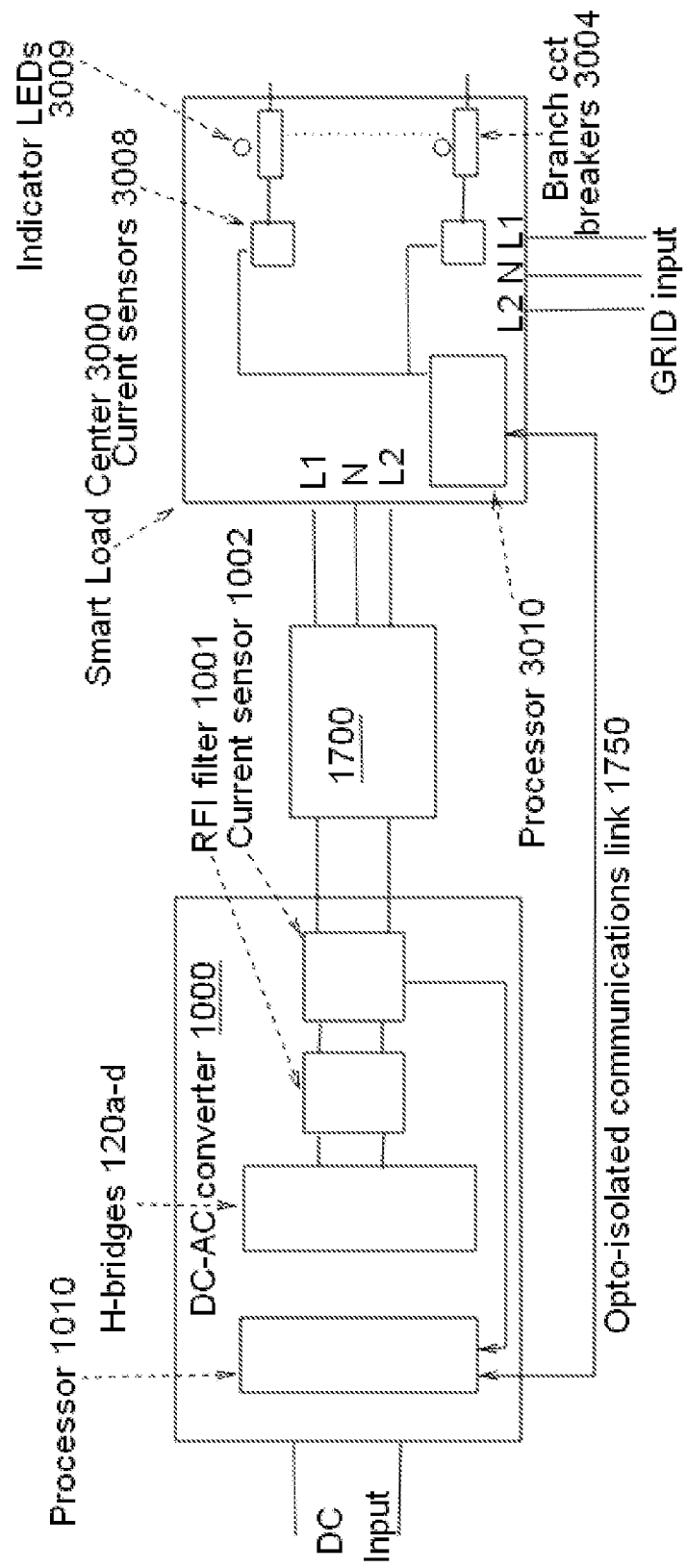
Figure 11: elements of the invention interconnected

OVERCURRENT TRIP COORDINATION BETWEEN INVERTER AND CIRCUIT BREAKERS

FIELD OF INVENTION

The present invention relates generally to electricity distribution, and in particular to systems and methods to handle the disparity between the trip-time curves of conventional circuit breakers and the trip-time curves of electronic DC-to-AC inverters.

BACKGROUND

Electrical installations commonly comprise a source circuit of first, high current capacity, such as a utility power service entrance, connected to a main distribution panel. Sub-circuits, the wiring for each of which is protected by an appropriate circuit breaker of a second, lower current rating, fan out from the main distribution panel to feed sub-panels. The sub-panels in turn fan-out to branch circuits, and the wiring for each branch circuit is protected by a circuit breaker of a third, even lower current.

The successively lower current ratings of the breakers at successive stages in the power fan-out notwithstanding, a fault at the lowest current level in the fan-out can cause an upstream breaker of a higher current level to trip, if the characteristic current-time curves of successive breakers are not coordinated. Such an event is undesirable because a fault on one subcircuit then takes out many sub-circuits that are not faulty.

When the original source of power to a breaker panel is an electronic DC-to-AC converter (also known in the art as an "inverter;" these terms are used interchangeably herein), such as may be used in a solar energy installation, it will generally exhibit a time-current overload trip curve that is much faster than an electromechanical circuit breaker, as electronic devices normally cannot tolerate the 10:1 current overload required to trip a mechanical circuit breaker in a short time. Therefore solutions are required that avoid a fault on one of a plurality of branch circuits served by a DC to AC converter causing a prolonged power loss for all branch circuits.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

An electrical installation according to the invention comprises an electronic, DC-to-AC converter that supplies power to a power distribution panel for distributing power to a number of branch circuits through circuit breakers that are appropriately rated for each branch circuit. The power distribution panel also receives AC power from a mechanical generator or electrical utility grid connection, hereinafter abbreviated to "the grid" and comprises transfer switches to select the source of power independently for each branch circuit that can be powered by either the electronic DC-to-AC converter or the mechanical generator. The transfer switches are operated by signals from a microprocessor that is controlled by a software program.

In the event of a branch circuit overload which causes a current overload trip of the DC-to-AC converter before that branch circuit's breaker trips, a detector detects the loss of input power from the DC-to-AC converter and in a first embodiment signals the microprocessor to operate the transfer switches to place all circuits on grid power. In a second, variant embodiment, the circuit which caused the overload of the inverter is not switched to the alternative supply, but left connected to the tripped inverter, in order to protect the switch contacts from excessive stress upon being switched to the grid with a potential short circuit condition present.

In the first embodiment, upon detecting resumption of power input from the DC-to-AC converter, the microprocessor rapidly scans the current consumptions from the grid of each circuit and accumulates the current values sequentially in circuit priority order high to low until the cumulative current is just below an acceptable or desired inverter load. Those circuits are then transferred back from grid to inverter to reduce consumption of expensive grid power.

In the second embodiment the inverter is restarted in a current limiting mode with only the overloading circuit connected The inverter is brought up from zero to full voltage in a rapid progression but stops increasing the voltage when the current reaches a maximum allowed limit. The current is then held at the limit for a predetermined time to attempt to trip the breaker on the overloading circuit. Depending on the observation of the current on that circuit, namely it (a) remains at a stable level under the breaker trip limit for that circuit, or (b) remains over the breaker trip limit for that circuit or (c) the breaker trips and the current drops to zero, the system comprised of the inverter and the smart transfer switch panel may adopt one or other logical action including indicating to the user if the circuit breaker tripped.

One embodiment relates to a method of operating a DC-to-AC converter operative to supply power to a plurality of branch circuits in an electrical installation, wherein each branch circuit is protected with an overcurrent protection device. An overcurrent condition is detected, and power output is halted in response to the overcurrent condition. The DC-to-AC converter is restarted by outputting less than a predetermined full output power in a manner coordinated with the time/current trip curve of an overcurrent protection device feeding a faulty branch circuit, so as to cause the overcurrent protection device of the faulty branch circuit to break on overcurrent.

Another embodiment relates to a DC-to-AC converter. The DC-to-AC converter includes a plurality of switching transistors operative to selectively switch the positive or negative value of one or more DC voltage sources, or zero volts, into a series connection operative to sum the switched DC voltages so as to approximate a desired instantaneous AC output voltage. The DC-to-AC converter also includes an AC output current sensor and current overload detector operative to produce digitized current indications. The DC-to-AC converter further includes memory operative to store a plurality of transistor switching sequences, each operative to generate a predetermined AC output waveform, and a processor operatively connected to the switching transistors, the current sensor, and memory. The processor is operative to retrieve a transistor switching sequence from memory; control the switching transistors according to the retrieved transistor switching sequence to produce the associated output waveform; monitor the digitized AC output current indications; and shut down the AC output and restart the AC-to-DC controller when the AC output current indications indicate a short circuit load. Upon restarting the DC-to-AC converter, the processor is further operative to select a transistor switching sequence corresponding to a low voltage and a current waveform of defined peak or rms value; and proceed to select one or more transistor switching sequences corresponding to waveforms of progressively higher voltage if a current less than a predetermined peak or rms current is sensed by said AC output current sensor.

Yet another embodiment relates to a smart load center operative to selectively distribute power from at least two AC electrical power sources to a plurality of branch circuits in an electrical installation, wherein one of said power sources is a DC-to-AC converter. The smart load center includes an appropriately rated overcurrent protection device located in the electrical power feed to each of the branch circuits; a current sensor operative to measure and digitize the current fed to each branch circuit, each current sensor generating numerical current readings; a transfer relay connected to each branch circuit and operative to connect the branch circuit to the DC-to-AC converter or another AC power source; and a processor operatively connected to the current sensors and transfer relays. The processor is operative to control the switching circuits to select the power source for each branch circuit; and receive the numerical current readings and maintain a recent history of current values on each branch circuit. Upon detecting a loss of power from the DC-to-AC converter, the processor is further operative to transfer to the other AC power source only those branch circuits that were powered by said DC-to-AC converter and whose recent current history indicates that a transfer may be safely carried out; and leave connected to the DC-to-AC converter any branch circuits whose recent current history indicates that a safe transfer could not be guaranteed.

Still another embodiment relates to an electrical installation operative to distribute, to each of a plurality of branch circuits protected by appropriate overcurrent protection devices, AC power from a selected one of an electricity grid and a DC-to-AC converter. The electrical installation includes a smart load center operative to selectively, independently connect each branch circuit to either the electricity grid or the DC-to-AC converter. The smart load center includes indicators associated with the overcurrent protection devices and operative to indicate status to a human user; current sensors operative to measure a current consumed by each branch circuit; and a processor operatively connected to the indicators and current sensors. The processor is operative to maintain a recent history of said measured currents; connect as many branch circuits as possible to the DC-to-AC converter without exceeding its maximum current capability; detect a loss of power from the DC-to-AC converter and in response, transfer to the electricity grid select any branch circuits whose recent current history indicates a recent current within the make current rating of the associated transfer relay, and to leave connected to the DC-to-AC converter any branch circuit whose recent current history indicates a recent current exceeding the make current rating of the associated transfer relay. The electrical installation also includes a DC-to-AC converter operative to convert DC power to any of a plurality of AC waveforms. The DC-to-AC converter includes a switching circuit operative to selectively switch the positive or negative value of one or more DC voltage sources, or zero volts, into a series connection operative to sum the switched DC voltages so as to approximate a desired instantaneous AC output voltage; an output current sensor; and a processor operatively connected to the switching circuit and the output current sensor. This processor is operative to control the switching transistors according to one of a plurality of predetermined switching sequences to produce a corresponding AC output waveform; and upon detecting an output current indicative of a short circuit load, shut down the AC output and restart the AC-to-DC controller. Upon restarting the DC-to-AC converter, the processor is further operative to select a switching sequence corresponding to a low voltage and a current waveform of defined peak or rms value; and proceed to select one or more transistor switching sequences corresponding to waveforms of progressively higher voltage or current limit until either a maximum current is reached or a normal voltage output is reached. If the maximum current is reached, the processor is operative to select a switching sequence corresponding to waveform maintaining the maximum current output for a predetermined time-out period. If there is no reduction in current, after the time-out period the processor is operative to communicate an indication to the smart load center to activate the indicators associated with those branch circuits left connected to the DC-to-AC inverter.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 1 shows the outline schematic of a smart load center.

FIG. 2 shows a complete solar installation using a stand-alone inverter.

FIG. 3 shows a step approximation to a sinewave.

FIG. 4 shows the inverter arrangement to produce a step approximation to a sinewave.

FIG. 5 shows the inverter low-pass output filter.

FIG. 6 shows the time/current trip curve of a electromechanical circuit breakers.

FIG. 7 shows a step approximation to a sinewave current through an inductor into a short circuit load.

FIG. 8 shows one cycle of H-bridge ternary drive waveforms to produce the current of FIG. 7.

FIG. 9 shows one cycle of H-bridge ternary drive waveforms that produce a 120 A rms sinewave current waveform through an inductor and 10 milliohm loss resistance into a short circuit load.

FIG. 10 shows the current waveform produced by the drive waveforms of FIG. 9.

FIG. 11 shows the elements that may form part of the invention collected together.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

FIG. 1 shows an automatic transfer switch panel for selecting, independently for each of a number of breaker circuits, whether a breaker circuit is powered by a first source, such as the electric utility grid, or a second source, such a DC-to-AC converter driven by a solar-charged storage battery. Such a panel is described in U.S. Pat. No. 9,735,703 (the '703 patent) to current applicant, entitled "Smart Load Center for Distribution of Power from Two Sources," the disclosure of which is hereby incorporated herein by reference in its entirety. The panel of the '703 patent provides an exemplary platform for describing the current invention; however, the invention is not limited to a system having only two sources, nor is it limited to the transfer switches for transferring between the multiple sources being collected together in a single unit. Rather, the inventive systems and methods described herein have been developed for, and apply to, any electrical installation that includes two alternative sources of power, one of which is a DC to AC converter, and devices for selecting the power from one or another source independently for each (or any) of a number of branch circuits or appliances, and distributing the selected power to the branch circuits or appliances through appropriately rated overcurrent protection devices, such as fuses or circuit breakers.

In FIG. 1, current sensors (3008) sense the current delivered through each breaker to its load circuit. The current is selected to have come from one or other of the quadruple bussbar lines (3001, 3002) by an associated one of SPDT relays (3003).

More details of the processing of current measurements made by the current sensors is given in U.S. patent application Ser. No. 15/676,826, filed Aug. 14, 2017, entitled "AC Electrical Power Measurements," by the current applicant, the disclosure of which is hereby incorporated herein by reference in its entirety.

The automatic transfer switch panel allows either utility or solar power to be selected independently for each breaker circuit. The transfer switches can be left in a position wherein the total normal load may be handled continuously by the solar array/battery combination with typically expected hours of sunlight, while preserving the ability to temporarily feed any other appliances from the solar system should an emergency need arise, or feed any load from utility in the event of a prolonged period without sun. Single Pole, Double Throw (SPDT) relays 3003 are used to select power either from one of the solar power busbars or from a utility power busbar. Each group of eight relays may be driven by a relay driver chip such as the Texas Instruments part number TPL9201, which have microprocessor interfaces that permit a microprocessor to control the relays.

On each side, the breakers may alternate connection to hotlegs L1 and L2, such that a pair of adjacent slots may be used for a double pole (240-volt) circuit such as a well pump or dryer. The source of power selected by each relay 3003 may be routed to its associated breaker through a toroidal core 3008 upon which a secondary is wound to provide a current sensor for each circuit. Alternatively, as described in the above-incorporated, concurrently-filed application, Hall Effect current sensors can be used. A microprocessor board (not shown) has inputs for the current sensor signals, for power from both solar and utility, interfaces for any user controls or displays and with external computers such as a PC, and provides control signals to the relays. Software then implements the intelligence to manage the loads.

The user or installer may set up the smart transfer panel upon installation either via front panel push buttons or by connecting to a PC, which can provide a more user-friendly interface. Set up may include initializing a time-of-day clock and determining, for each circuit, a priority for it to be kept powered if a prolonged utility outage occurs.

FIG. 2 shows the diagram of a complete electrical installation in which the smart transfer panel of FIG. 1 (3000) is embedded. A solar array (1500) comprises solar panels connected in series to form strings providing the desired voltage, the current from the strings being selectively added by parallel connection within string combiner (700). Further details of the operation of a string combiner are disclosed in U.S. Pat. No. 10,205,324 to current applicant, entitled "Remote Controlled Photovoltaic String Combiner," the disclosure of which is hereby incorporated herein by reference in its entirety. The string combiner may be controlled by the DC-AC inverter (1000) along a control cable (1751) in order to determine how much solar charge current is applied to a battery (500), and also controlled to de-energize the DC wiring in an emergency situation, such as fire. The string combiner may also contain arc-fault prevention means, as described in U.S. Pat. Nos. 9,190,836 and 8,891,211, both of which are hereby incorporated herein by reference in their entireties.

Solar-derived current supplied by the string combiner (700) is used to keep the battery (500) charged. DC protection circuitry (550) located in the heavy-current wiring between the string combiner (700) and the battery, and between the battery and inverter (1000), protects the wiring against short circuits and also may provide rapid de-energization of the wiring in an emergency, as disclosed in U.S. patent application Ser. No. 15/197,431 to current applicant, filed Jun. 29, 2016 and entitled "Rapid De-energization of DC Conductors with a Power Source at Both Ends," the disclosure of which is hereby incorporated herein by reference in its entirety.

The voltage from the battery (500) is fed to the DC to AC inverter (1000), which may incorporate ground fault detection on the DC circuitry all the way up to the array. A novel and sensitive means of detecting ground faults was disclosed in U.S. Pat. No. 8,937,822 (the '822 patent) to current Applicant, entitled, "Solar Energy Conversion and Utilization System," the disclosure of which is hereby incorporated herein by reference in its entirety. The '822 patent also discloses details of a new and advantageous DC to AC inverter principle. The inverter (1000) may produce a single phase, 120-volt rms 60 Hz output designated the L1 phase. U.S. residential power also uses a second, antiphase live feed designated L2. A phase splitter (1700) may be used to derive L2 from L1. Phase Splitter (1700) may be a 60 Hz autotransformer, or may be based on the new principle disclosed in U.S. Pat. No. 9,634,552 to current Applicant, entitled, "Solid State Phase-Splitting Transformer," the disclosure of which is hereby incorporated herein by reference in its entirety. The L1 and L2 feeds so produced are fed together with the neutral wire N into the smart load center (3000) which also receives a separate L1 and L2 and neutral input from the electric utility grid.

A microprocessor within smart load center (3000) strives to place as much load on the free, solar-derived output of the inverter (1000) as possible, in order to minimize the user's electricity bill. Information about the state of the battery (500), and the amount of solar power currently being received, may be used to achieve that objective. A communications link 1750, which may be galvanically isolated by use of optoislators, provides for interchange of information between the smart load center (3000) and the inverter (1000) for such purposes.

Assuming that a number of branch circuits are currently selected by the smart load center (3000) to be powered by the inverter (1000), it is necessary to contemplate the behavior that occurs should the total power momentarily exceed the inverter capacity, for example, due to a fault condition such as an accidental short circuit on a branch circuit. A short circuit can result in very rapid increase of current to very large values, which could damage the semiconductor switches in the inverter. Therefore, it is common to equip inverters with the ability to withstand modest overloads, for example 50% over normal continuous load current capability, for short periods of time such as one second, while switching off very rapidly for higher current overloads, such as would occur with a short circuit on a branch circuit. The speed at which an inverter would trip on such a short circuit fault condition may be much faster than the time taken for the branch circuit overcurrent protection device (i.e., an electromechanical circuit breaker) to operate. Therefore, if such a condition arises, the inverter (1000) power input to the smart load center (3000) ceases, causing it to attempt to maintain the loads which were switched to solar power by switching them to grid power. If the short circuit branch circuit is switched to grid power, the substantially unlimited current from the grid should be sufficient to trip the breaker. Thus the remaining circuits continue to receive power with only a very short and unnoticeable interruption as relays (3003) switch from solar to grid power.

Two alternative recovery scenarios are considered from an inverter overload trip. The first scenario is where all branch circuits that were switched to solar are now switched to utility, ensuring that the breaker of the branch circuit that was short circuited is now tripped. In that case, the inverter (1000) may attempt an automatic restart on no load. If the restart is successful, the smart load center (3000) will, upon sensing the restoration of inverter power, and after allowing a time to verify that it is stable, perform its normal function of transferring branch circuits from grid to solar power, in priority order, up to a total load that is within the inverter's capacity and which can be supported by the amount of solar energy received or the current battery charge state. In performing the load calculation, the microprocessor may employ various algorithms, depending on the nature of the circuit or appliance, in which either actual current may be used or anticipated current may be used or some statistical probability distribution of total load for the sum of the selected circuits may be used, all of which however execute in a time on the order of hundreds of microseconds.

A problem can arise in relying upon the recovery method of the above-described first scenario when the ability of source selection relays to withstand switching to grid with a short circuit load is limited. When a short circuit branch circuit is switched by a relay (3003) to the substantially current-unlimited grid to trip the breaker, the instantaneous current as the relay contacts close may be sufficient to cause welding of the contacts. In general, it is desirable to coddle relay contacts in order to ensure reliable operation during a long operational life, and many ways to do so, in order to prolong the life of relays, have been described in the above-incorporated patents. The techniques comprise switching the relays, to the maximum extent possible, only when there is zero or very low current flowing through them, or else zero or very low voltage rise across the contacts, or both.

This philosophy may be applied to the problem at hand in the following manner: When smart load center (3000) senses the loss of inverter power and thus is going to switch branch circuits to the grid, it can be programmed to first examine the immediate current history on each branch circuit, and switch only those circuits to the grid for which the immediate current history indicates a current less than the specified relay closing contact ratings. Relay manufacturers specify in their data sheets their relay's capability to "make" or close a circuit taking a certain current and separately specify the ability of the relay contacts to "break" a certain current while guaranteeing reliable operation for many thousands of cycles. Thus, any branch circuit that was passing a current just before the inverter tripped, which was greater than the contact "make" rating, may be left connected to the tripped inverter. Now if the inverter attempts a restart, it will be starting on-load, and maybe a short circuit load, as opposed to no-load.

While the problem described is the main one to be addressed, it can be mentioned that a similar problem exists if the grid should fail and circuits are to be transferred to the inverter. The difference, however, is that the inverter available current is not unlimited, and thus is less likely to cause contact welding of relays (3003). Nevertheless, the same philosophy can be applied if desired, namely, that only circuits that were consuming less than the relay contact "make" ratings could be transferred, leaving the rest on the grid. A variant of the latter is for the smart load center (3000) to momentarily signal to the inverter (1000) that a circuit taking a large current is to be transferred, so that the inverter can interrupt its output for the approximately 10 milliseconds that it would take for the relay contacts to move over, and to resume inverting only after the relay contacts were closed. Moreover, inverting can be resumed on a voltage zero-crossing. Such an action would not cause more power interruption than the approximately 10 mS relay switching time. Thus better solutions can be achieved when the smart load center (3000) and the inverter (1000) collaborate in an integrated system, than can be achieved with either component alone.

A procedure for restarting an inverter on-load will now be described, and in particular, for the case where the load may be a short circuit that was not removed from the inverter by switching the load to the grid.

The inverter described in the above-incorporated '822 patent includes a number of features enabling faults to be detected on starting up or powering down. The hardware to implement those features comprises relays to disconnect the AC output from the load; relays to apply the DC input in a "soft" manner to avoid high in-rush currents, and microprocessor software routines to control the hardware in a sequence that permits the detection of fault conditions at each stage. The start-up and power-down sequences are further described in U.S. Pat. No. 10,128,774 to current applicant, entitled "Inverter Inrush Current Limiting," the disclosure of which is hereby incorporated herein by reference in its entirety. The hardware provided in such an inverter may also be controlled by the microprocessor, to provide an extended soft start-up procedure to resolve the problem of starting-up into a potentially short-circuit load, as will now be described. The soft-start-up procedure envisaged in the above-incorporated '039 application is summarized as follows:

Step 1: Upon manual switch on or automatic restart, DC input power is first applied only to the control microprocessor circuits, and not to the power-generating circuits. A diode in series with the microprocessor supply prevents any operation if the supply is connected with the wrong polarity. The microprocessor may perform a limited number of tests at this point, for example, measuring the DC input voltage and verifying that it is between the minimum and maximum allowed input voltages. If the voltage is out of limits, start-up does not proceed to step 2.

Step 2: The microprocessor then starts the MOSFET power switching transistors switching before DC power is applied to them. This is possible by using the microprocessor supply to power the MOSFET gate drivers independently of the main DC power input. The microprocessor then closes a start-up relay that applies DC power to the switching transistors through a series incandescent filament lamp, typically a small, 100 watt quartz-halogen tube. Due the large decoupling capacitors on the DC power lines powering the MOSFET power switches, a current will flow while they are charging, which is sufficient to momentarily light the lamp. This is detected by a photodiode, and the microprocessor uses the photodiode output to verify that the lamp lights momentarily and then goes out, as the no-load current taken by the inverter should be very low, and insufficient to keep the lamp lit. This verifies that the MOSFETs are not exhibiting short circuit failures. If such verification is not obtained, a self-diagnosis software procedure may be entered, in which transistors are switched individually to attempt to localize the failed device.

Step 3: Upon passing step 2 successfully, a DC power relay is closed to short circuit the lamp and allow the inverter to generate full output when demanded.

Step 4: At this point, the AC output relays are open so there is no load on the output. Before closing the output relays, the MOSFET switching transistor drive signals are momentarily interrupted so that there is no AC voltage generated. The relays are then closed, and then the MOSFET drive is resumed to create an AC output to the load. The relay contacts therefore close on a no-load condition.

To address the issues outlined in the present application, step 4 can be extended to provide a soft start-up of the AC voltage after the AC output relays are closed, in case there is short circuit or other excessive load present on the output. One implementation of the inverter of the '822 application comprises synthesizing the sinewave output at 60 Hz by combining together DC voltages V1, V2, V3, V4, which are in approximate power of 3 ratios to one another, using ternary weighting factors that can take on the values +1, −1, and 0, to produce a weighted sum voltage which is equal to the instantaneous voltage of a point on the desired sine waveform. The sequence of ternary weighting factors are stored in microprocessor memory along with the time instants at which they shall be used in order to generate the best step approximation to the desired sinewave.

The nominal values of voltages V1, V2, V3, and V4 are 120, 40, 13.33, and 4.44 volts. When all ternary weights are +1, this gives a sum of 177.77 volts and when all are −1 the sum is −177.77 volts. Thus any waveform lying between positive and negative peak values of +177.77 volts can be synthesized, in steps of 4.44 volts. Such a waveform is shown in FIG. 3. It is also possible to generate lower voltages than the maximum peak-to-peak swing. The lowest AC voltage that can be generated would have a peak-to-peak swing of ±4.44 volts, however, an effective voltage lower than that can be obtained by limiting the time at which the voltage lies at +4.44 volts or −4.44 volts, and keeping the ternary multiplier at zero during the rest of the cycle.

FIG. 4 shows the principle of the step-approximation DC-to-AC converter. The ternary weights of +1, −1, or 0 are applied to the DC voltages 120, 40, 13.33, and 4.44 using polarity reversing switches in the form of full H-bridges 120a, 120b, 120c, and 120d. Control circuit (200) drives the gates of the H-bridges via high-isolation MOSFET drivers, which can employ optoisolation or other means of isolation between their logic inputs and the MOSFET gate drive outputs. The H-bridges can thereby be controlled to either pass the associated DC voltage inverted or non-inverted, or to act as a pass-through without adding or subtracting a voltage. If 120a, 120b, and 120c are controlled to the pass-through state, then controlling 120d will output +4.4 volts, −4.44 volts or zero from output (150).

Output (150) from the inverter of FIG. 4 is passed through the low-pass filter of FIG. 5 to attenuate radio frequency interference components present in the stepped waveform of FIG. 3. If the inverter is started up with a short circuit on the output, the 10 uH series inductor will limit the rate of increase of current in a predictable way. For example, if a V=4.44 volt step is output for dT=10 uS, then the current will increase according to the equation VT/L where L is the inductance value; this yields 4.44 amps after 10 uS. If the inverter normally has the capability to output 60 amps rms or 84 amps peak, the 4.44 volt duration could be extended to at least 150 uS without overload, giving 66.6 amps at the end of 150 uS. If H-bridge 120d is then controlled to output zero volts, the current will decay at a slower rate. The current waveform will in fact depend on the load on the inverter, and in principle the sensed current waveform can be digitized and analyzed by the microprocessor to determine the load in a very short space of time, thereby indicating if the load is of a magnitude that would trip the inverter if it proceeded to generate full output. However, the objective is rather to allow the inverter to proceed with increasing its output voltage until it either reaches the normal 120 v rms AC output without overloading, or else it reaches the maximum current limit, at which point it will be held at that current for a time sufficient to trip the breaker of the faulty branch circuit.

FIG. 6 shows the typical trip time versus overload current of a thermal/magnetic circuit breaker, and indicates that a 10:1 current overload will cause a trip in between 0.8 and 2 seconds, while a 6:1 overload will require between 2 and 5 seconds to trip. If the breaker on the short-circuit branch circuit is a 20 amp breaker, it will therefore require 120 amps for up to 5 seconds to trip it. Various alternative inverter start-up behaviors can be envisaged designed to clear such a fault.

In a first method, the inverter may be arranged to increase its output according to a fixed schedule, until either it reaches normal output voltage without current overload, or until it reaches an output current of 120 amps rms, at which it may hold for 5 seconds to attempt to trip the breaker on the faulty circuit. If the fault does not clear in 5 seconds, the inverter may logically shut down, wait for a period, and then attempt to clear the faulty circuit again. A maximum number of tries may be programmed after which it shuts down, issues a warning indication, and awaits manual intervention.

A signal may also be sent from the inverter to the smart load center using communications line (1750), which can cause indicator LEDs adjacent to any breakers switched to the inverter to flash in case manual intervention becomes necessary. Manual intervention can comprise switching a breaker to OFF, selecting, via a man-machine interface, to power that branch circuit from the grid, then attempting to reset the breaker. Should the breaker trip, the user must locate and clear the short circuit on that branch circuit. The preprogrammed start-up schedule can comprise starting at a low level of output by generating only +/−4.44 volt steps of a limited duration, as described above, and increasing the duration gradually, and then increasing the voltage to 8.88 volts peak, 13.33 volts peak and so on, ceasing the increase if the current reaches a threshold such as 120 amps. The inverter would then hold that level of voltage for a predetermined time to attempt to trip the breaker on the bad branch circuit.

A second programmed inverter start-up method can comprise starting with a low voltage level as above, namely 100 uS pulse of 4.44 volts alternating +/− at the 60 Hz rate, and measuring the current output using a current sensor and A-to-D converter. From the current measured with a known output voltage waveform, the output voltage waveform that would result in 120 amps of current can be determined. If this is greater than full output, the inverter proceeds to full output, else the inverter proceeds only to the voltage determined to result in 120 amps. It is possible that the current will not reach 120 amps due to certain types of load such as incandescent filament lamps or motors taking less current as they warm up to normal operation. The sensing of current and recalculation of the voltage to give 120 amps therefore preferably continues in a closed loop until either the inverter reaches full voltage output or else there is a time out.

A variation of the above method is to start-up the inverter at a low voltage using a preprogrammed low-voltage set of MOSFET switch drive waveforms to give a desired low voltage, to measure the output current so produced, and to use the voltage and current to compute the load impedance. From the load impedance, the required voltage to reach 120 amps can be calculated, and the inverter then starts to generate that voltage. The (measure impedance)—(increase voltage)—(re-measure impedance) loop continues to operate until either the inverter reaches full output or else a time out is reached.

Yet another variation is to precompute a sequence of MOSFET switch drive waveforms that will produce a good approximation to a 120 amp rms sinewave current when the inverter is operating into a short circuit. The only load on the switches then being the 10 uH filter inductor of FIG. 5, the current is the integral of the voltage waveform produced by the switches. Only the 4.44 volt H-bridge need be operated to obtain a 120 amp rms sinewave current into the 10 uH inductor with a short on the output. With this waveform, the actual current is measured and thereby the actual load impedance, if not a short circuit, is determined.

FIG. 8 shows the set of precomputed ternary drive waveforms for the 4.44 volt H-bridge necessary to obtain 120 volts rms sinewave into the 10 uH inductor.

FIG. 7 shows the step-approximation current waveform so obtained. The drive waveform may be computed using the pseudocode below:

```
T=1/60; dT=T/512; dV=4.44; w=120π; L=10µH; dI=dV*dT/L
ActualCurrent=0; Time=0
FOR k=1 to 512
    TernaryDigit(k)=0; DesiredCurrent=168*SIN(w*Time)
    IF(DesiredCurrent−ActualCurrent>dI/2)THEN
        TernaryDigit(k)=1; ActualCurrent=ActualCurrent+dI
    ELSE
        IF(ActualCurrent−DesiredCurrent>dI/2)THEN
            TernaryDigit(k)=−1; ActualCurrent=ActualCurrent−dI
        ENDIF
    ENDIF
    Time=Time+dT
NEXT k
```

In the above pseudocode, the addition factor Lambda accounts for the decay of the current between steps due to the loss resistance.

Waveforms as discussed above may be used to probe the load during inverter restart after a trip, or during normal start-up. The load current may be measured using a Hall Effect sensor such as the Allegro ACS756SCA placed between the output of the RFI filter of FIG. 5 and load, for example, just before the L1 output isolation relay. The Hall Effect sensor has a wide bandwidth and fast response time, and can be compared to a trip threshold of just greater than 168 amps peak to cause a rapid shutdown of the inverter. The output can also be low-pass filtered and digitized by the main processor's A-to-D converter at a rate of 8 samples per cycle, and the peak, rms, or fundamental value (computed with an 8-point Fourier Transform) can be used to indicate the magnitude of the load.

If the load current is much smaller than would occur with a dead short, a higher voltage probe waveform can be used for a new load probe on a subsequent cycle. A jump can be made to a much higher voltage if the load current is low. The inverter therefore progresses rapidly through a sequence of cycles of ever increasing trial outputs until it reaches one either giving a current that will trip the breaker of a faulty circuit or else normal output level is reached. As for normal output waveforms, the H-bridge drive sequence for the reduced voltage load-probe waveforms can be stored in a memory-efficient way by storing the times or timer counts at which a particular H-bridge control-byte value shall be output, as opposed to storing the switch control bytes for each clock cycle.

It has therefore been described above how, in an electrical system comprising a DC-to-AC inverter and a breaker panel for distributing its output power to a number of circuits, the overcurrent trip behavior of the DC-to-AC inverter can be coordinated with the trip behavior of an electromechanical circuit breaker in order for the inverter to be able to clear a fault by tripping the breaker of a faulty branch circuit. Moreover, it has been disclosed how a breaker panel, configured as a smart load center for selecting between an inverter power source and the electric utility grid, can be programmed to maintain the load current for branch circuits that remain in a normal condition by switching from a tripped inverter to the grid, at least those branch circuits that are momentarily consuming a lower current than the make current rating of the selection relays. By examining recent current history of the branch circuits, the smart load center can avoid transferring to the grid a branch circuit having an overcurrent condition that exceeds the make current rating of the selection relays. Thus embodiments of the present invention serve the dual purpose of protecting the longevity of relay contacts, while maintaining power on loads that are not in a fault condition.

FIG. 11 collects together the elements that may be used to implement embodiments of the present invention. It may be seen that the DC-to-AC inverter (1000) contains a processor (1010) that may communicate with processor (3010) of smart load center (3000) using opto-isolated communications link 1750; however, intercommunications between processors is not essential for implementing certain claimed aspects of the present invention. The DCto-AC inverter (1000) is shown to contain a current sensor (1002) which is linked to provide AC output current readings to the processor (1010). Likewise, the smart load center (3000) contains current sensors (3008) linked to a processor (3010) to provide branch circuit current readings, which may be memorized to provide current history immediately before a loss-of-power event. Smart load center (3000) may also contain indicator LEDs (3009) in 1:1 association with the branch circuit breakers. These can be two-color LEDs to indicate whether the power of a branch circuit is currently being drawn from converter (1000) or from the grid input, and the LED, when lit with either color, may be flashed to indicate to a human user that a fault on that circuit requires manual intervention to clear it.

While the inverter behavior has been described assuming electromechanical overcurrent protection devices, it will be realized that the invention is equally applicable when fuses are used as overcurrent protection devices.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of operating a DC-to-AC converter operative to supply power to a plurality of branch circuits in an electrical installation, wherein each branch circuit is protected with an overcurrent protection device, comprising:
    detecting an overcurrent condition and halting power output in response to the overcurrent condition; and
    restarting the DC-to-AC converter by outputting less than a predetermined full output power in a manner coordinated with the time/current trip curve of an overcurrent protection device feeding a faulty branch circuit, so as to cause the overcurrent protection device of the faulty branch circuit to break on overcurrent.

2. The method of claim 1 wherein if the overcurrent protection device of the faulty branch circuit breaks, outputting the predetermined full output power.

3. The method of claim 2 wherein outputting the predetermined full output power comprises ramping up the output power to the predetermined full value in stages, while performing fault detection at one or more such stages.

4. The method of claim 1 wherein if the overcurrent protection device of the faulty branch circuit does not break on overcurrent within a predetermined duration, outputting a fault indication.

5. The method of claim 1 wherein restarting the DC-to-AC converter by outputting less than a predetermined full output power in a manner coordinated with the time/current trip curve of an overcurrent protection device feeding a faulty branch circuit, so as to cause the overcurrent protection device of the faulty branch circuit to break on overcurrent comprises
    initially outputting power at less than a predetermined full voltage;
    monitoring a current drawn; and
    increasing the voltage of output power to
        a voltage below the predetermined full voltage in the case that a corresponding current reaches a predetermined maximum allowed current, and
        the predetermined full voltage in the case that the corresponding current does not reach the predetermined maximum allowed current; and
    in the case that the current is the predetermined maximum allowed current, halting power output after a predetermined duration.

6. The method of claim 5 wherein increasing the voltage of output power comprises increasing the voltage according to a predetermined schedule.

7. The method of claim 5 wherein increasing the voltage of output power comprises:
    based on the initial voltage, the corresponding monitored current, and the known voltage waveform, determining a voltage corresponding to the predetermined maximum allowed current; and
    outputting power at the determined voltage.

8. The method of claim 5 wherein increasing the voltage of output power comprises, iteratively:
    based on a current voltage and the corresponding monitored current, calculating the instantaneous load impedance;
    based on the calculated load impedance, calculating a voltage resulting in the predetermined maximum allowed current; and
    outputting power at the calculated voltage.

9. A DC-to-AC converter comprising:
    a plurality of switching transistors operative to selectively switch the positive or negative value of one or more DC voltage sources, or zero volts, into a series connection operative to sum the switched DC voltages so as to approximate a desired instantaneous AC output voltage;
    an AC output current sensor and current overload detector operative to produce digitized current indications;
    memory operative to store a plurality of transistor switching sequences, each operative to generate a predetermined AC output waveform; and
    a processor operatively connected to the switching transistors, the current sensor, and memory, and operative to
        retrieve a transistor switching sequence from memory;
        control the switching transistors according to the retrieved transistor switching sequence to produce the associated output waveform;
        monitor the digitized AC output current indications; and
        shut down the AC output and restart the AC-to-DC controller when the AC output current indications indicate a short circuit load;
    wherein upon restarting the DC-to-AC converter, the processor is further operative to
        select a transistor switching sequence corresponding to a low voltage and a current waveform of defined peak or rms value; and
        proceed to select one or more transistor switching sequences corresponding to waveforms of progressively higher voltage if a current less than a predetermined peak or rms current is sensed by said AC output current sensor.

10. The DC-to-AC converter of claim 9 wherein, if the current sensed by the AC output sensor is greater than the predefined peak or rms value, the processor is operative to:
    not select a transistor switching sequence corresponding to a higher voltage waveform; and
    continue to generate the last selected AC waveform for a predetermined time-out period; and
    after the predetermined time-out period, shut down the DC-to-AC converter.

\* \* \* \* \*